United States Patent [19]

Engel et al.

[11] Patent Number: 5,297,865
[45] Date of Patent: Mar. 29, 1994

[54] METHOD AND APPARATUS FOR THE MIXING OF MIXING MATERIAL WITH THERMOPLASTIC MATERIAL

[75] Inventors: Wolfgang Engel, Freudenberg-Oberfischbach; Andreas Limper, Wenden-Schönau; Walter Häder, Olpe, all of Fed. Rep. of Germany

[73] Assignee: Werner & Pfleiderer Gummitechnik GmbH, Fed. Rep. of Germany

[21] Appl. No.: 748,647

[22] Filed: Aug. 22, 1991

[30] Foreign Application Priority Data

Sep. 5, 1990 [DE] Fed. Rep. of Germany ....... 4028064

[51] Int. Cl.$^5$ .......................... B28C 7/10; B01F 15/02
[52] U.S. Cl. ......................................... 366/76; 366/78; 366/84
[58] Field of Search .................. 366/76, 83, 79, 78, 366/84, 85, 86, 88, 89, 90, 91, 292; 425/207, 208, 209

[56] References Cited

U.S. PATENT DOCUMENTS

| | | | |
|---|---|---|---|
| 3,861,287 | 1/1975 | Manser | 366/83 |
| 4,063,718 | 12/1977 | Koch | 366/76 |
| 4,124,307 | 11/1978 | Anisic | 366/76 |
| 4,214,862 | 7/1980 | Kolossow | 366/76 |
| 4,234,259 | 11/1980 | Wiedmann et al. | |
| 4,730,937 | 3/1988 | Hehl | |

FOREIGN PATENT DOCUMENTS

| | | |
|---|---|---|
| 3606542 | 3/1986 | Fed. Rep. of Germany . |
| 3525982 | 2/1989 | Fed. Rep. of Germany . |
| 1301959 | 7/1961 | France . |

OTHER PUBLICATIONS

Hensen, Kaskaden-Extrusionssysteme verbessern den Extrusionsprozeb, Kunstoffe 80 (1990) 6 (Jun. 1990).

Primary Examiner—Robert W. Jenkins
Attorney, Agent, or Firm—Laff, Whitesel, Conte & Saret

[57] ABSTRACT

A plastics processing machine is associated with an internal mixer. Thermoplastic material is separately melted in the plastics processing machine and injected into the mixing chamber of the internal mixer, where it is mixed with fillers, caoutchouc or the like.

7 Claims, 2 Drawing Sheets

METHOD AND APPARATUS FOR THE MIXING OF MIXING MATERIAL WITH THERMOPLASTIC MATERIAL

FIELD OF THE INVENTION

The invention relates to a method for the mixing of mixing material, such as fillers and/or caoutchouc, with thermoplastic material, the thermoplastic material being melted and the mixing material and the molten thermoplastic material being subjected to a common mixing process and to an apparatus for the execution of such a method.

BACKGROUND OF THE INVENTION

Numerous variants of so-called internal mixers, kneaders or Banbury mixers have been disclosed. Basically they are batch-wise operated mixers with a mixing chamber comprising two cylindrical partial mixing chambers overlapping each other in part. A mixing shaft with one or several kneading blades is arranged in each partial mixing chamber. These blades may mesh or rotate one past the other. The blades are driven to rotate in opposite directions. Mixing material is supplied from above through a feed shaft to be closed by means of a stamp arranged in the vicinity of the upper saddle of the mixing chamber. A discharge opening is provided in the vicinity of the lower saddle of the mixing chamber. Such mixers are for instance known from U.S. Pat. No. 4 058 296, from U.S. Pat. No. 4 234 259 or from DE 20 59 844 A (corresponding to U.S. Ser. No. 882 560 of Dec. 5, 1969). Such internal mixers are preferably used to knead caoutchouc and to include fillers and additives into caoutchouc. But they can also be used for a plurality of other mixing and kneading objects. The melting of thermoplastics in the internal mixer, as it occurs for the manufacture of thermoplastic elastomers or cable compounds during mixing with caoutchouc, is extraordinarily time-consuming. It is even more difficult if not impossible to manufacture highly loaded compounds, in which the fillers are not to be damaged if possible, so that they are supplied to the mixer only after the basic material is completely melted. If internal mixers are used to this effect, this means that the mixer is filled only to some minor degree when the thermoplastics are first supplied in the form of granules, grit or powder. The power supply to the thermoplastic is extraordinarily small with the consequence that the melting process takes an extremely long time or does not take place at all, the more so as for structural reasons the width of the gap between the blades and the wall of the mixing chamber is as a rule comparatively large, by all means larger than the grain diameter of thermoplastic in the form of grit or powder. As a rule this also applies to the grain size of granules in comparison to the gap widths between the kneading blades and the wall of the mixing chamber. Even if the grain size of the granules is larger than the gap, the granules will mostly roll along the kneading blades and will not be sheared in the gap, until they are sufficiently heated to stick to the wall of the mixing chamber or the kneading blades.

It has further been disclosed to inject oils directly into the mixing chamber of internal mixers by way of an injection nozzle.

SUMMARY OF THE INVENTION

It is accordingly the object of the invention to create a method and an apparatus of the generic kind by means of which a mixing process can be performed with the use of an internal mixer.

This object is attained in a method of the generic kind whereby the thermoplastic material is melted and injected separately from the mixing material and whereby the common mixing process takes place subsequently. Furthermore, this object is attained in an apparatus of the generic kind whereby an internal mixer is provided, to the mixing chamber of which a plastics processing machine with an injection unit is connected by means of an injection channel. According to the invention the thermoplastic material is melted separately and injected into the mixing material, as a rule a filler or also caoutchouc, this injection in particular taking place into an internal mixer in which the mixing material is mixed with the injected thermosplastic material. The subsequent mixing process in the internal mixer takes place very rapidly and very gently towards the mixing material such as the molten thermoplastic material.

Numerous further features, details and advantages of the invention will become apparent from the ensuing description of an example of embodiment taken in conjunction with the drawing.

DESCRIPTION OF THE PREFERRED EMBODIMENT

Figure 1:
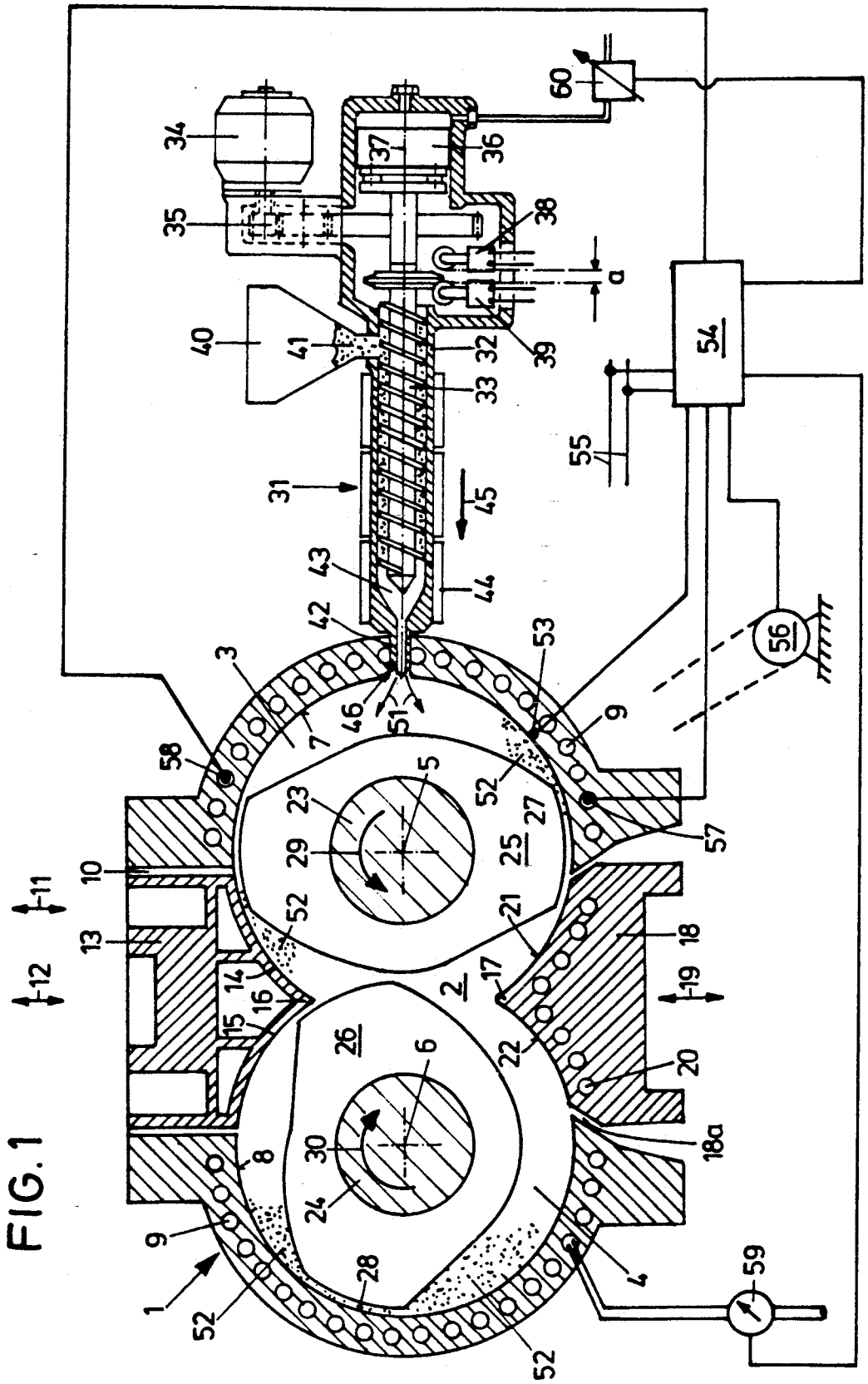
FIG. 1 is a cross-section of an apparatus for the mixing of mixing with thermoplastic material comprising an internal mixer and a plastics processing machine in a diagrammatic representation.

So-called internal mixers, also known as Banbury mixers, are generally known in their basic structure. In usual manner the internal mixer shown in the drawing has a housing 1, in which a mixing chamber 2 is formed comprising two cylindrical partial mixing chambers 3, 4, of which the axes 5, 6 extend parallel to each other and which partially overlap each other. In the proximity of the walls 7, 8 of the partial mixing chambers 3, 4 temperature-regulating channels 9 are provided. Material to be processed can be supplied as mixing material to the mixing chamber 2 through a feed shaft 10 from above according to the arrow 11 showing the feed direction. If necessary it is pressed into the mixing chamber 2 by means of a stamp 13 displaceable in the feed shaft 10 according to the double-headed direction arrow 12. The stamp 13 simultaneously serves to close the mixing chamber 2 towards the feed shaft 10. For this purpose it has limiting walls 14, 15 positioned to take the path of the walls 7, 8 and defining a saddle 16 of the cylindrical partial mixing chambers 3, 4 overlapping each other in part.

A discharge gate 18a is arranged in the lower saddle 17 of the mixing chamber 2 and can be closed by means of a discharge flap 18. The discharge flap 18 can be pivoted downwards according to the arrow 19 showing the opening direction. It also has temperature-regulating channels 20 and limiting walls 21, 22 congruent with the walls 7, 8 and defining the lower saddle 17.

Shafts 23, 24 are arranged in both of the partial mixing chambers 3, 4; these shafts 23, 24 are in alignment with the axes 5, 6 and are in usual manner driven to rotate by a motor not shown. Kneading blades 25, 26 are arranged on the shafts 23, 24, they extend in the direction of the axes 5, 6, are helically wound over the circumference of the shafts 23 or 24 and rotate each leaving free a gap 27, 28 towards the wall 7, 8 of the mixing chamber 2. Due to the overlapping of the partial mixing chambers 3, 4 the kneading blades 25, 26 are in engagement when they rotate, i.e. they mesh.

It is also possible for the kneading blades to be formed such that when rotating they are not in engagement, but are only tangent to each other, in which case the shafts are driven to rotate regularly in the same direction.

As far as described above the internal mixer is generally known.

Further, a plastics processing machine 31 is provided, which may be a screw machine with one shaft or two shafts. It may be an injection-moulding machine or an extruder. It is connected to the mixing chamber 2 of the internal mixer.

The plastics processing machine 31 usually has a housing 32 with a screw shaft 33, on which additional mixing and kneading elements not shown may be arranged. The screw shaft 33 is driven by a drive motor 34 via a transmission 35. At its end facing away from the internal mixer it is connected with a hydraulically actuatable piston-cylinder drive 36, by means of which the screw shaft 33 can be displaced in the direction of its axis 37 within the housing 32. This displacement is limited by the limit switches 38, 39.

A feed hopper 40 for thermoplastic material to be melted, which usually has the form of granules 41 or grit or powder, opens into the housing 32 at its end section facing away from the internal mixer. At the other end the housing 32 opens with an injection channel 42 into the mixing chamber 2 of the internal mixer. A melt chamber 43 collecting molten thermoplastic material precedes the injection channel 42 in the housing 32. Melting takes place right from the supply through the feed hopper 40 as a result of the mechanical stress exercised by the screw shaft 43 and under heat supplied by heatings 44 provided on the housing 32 during simultaneous conveyance towards the melt chamber 43. As a result of hydraulic actuation of the drive 36 and the resulting displacement of the screw shaft 33 in the injection direction 45, i.e. in the direction towards the mixing chamber 2 of the internal mixer, thermoplastic material melted by means of the screw shaft 33 is injected from the melt chamber 43 through the injection channel 42 into the mixing chamber 2. The plastics processing machine 31 shown functions according to the screw-piston-injection-moulding principle.

Figure 2:
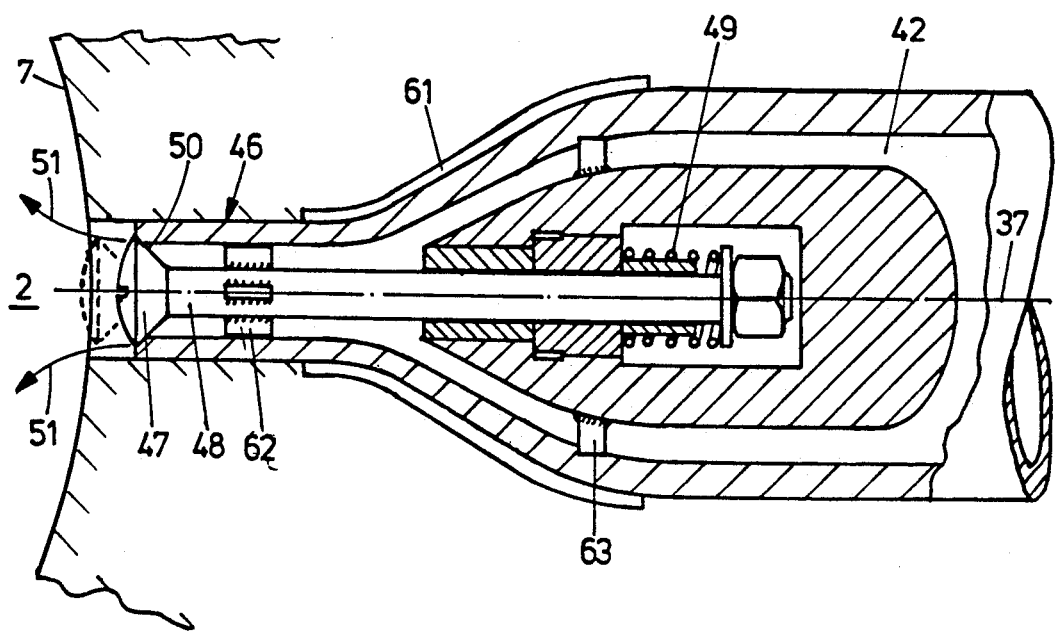
FIG. 2 shows a detail of FIG. 1 concerning a non-return valve on an enlarged scale.

A valve 46 is arranged where the injection channel 42 opens into the mixing chamber 2 of the internal mixer; this valve 46 only opens when molten thermoplastic material is injected from the plastics processing machine 31 through the injection channel 42 into the mixing chamber 2. Otherwise this valve 46 is closed. It may therefore be a non-return valve, which opens under the pressure exercised by the plastic melt ejected by the plastics processing machine by means of the screw shaft 33, as shown in FIG. 2. But it may also be a controlled valve to be actuated electromagnetically, hydraulically or pneumatically, as basically commercially available.

The valve shown in FIG. 2 is a non-return valve having a valve tappet 48, which is provided with a valve disk 47 and which is loaded at its end facing away from the valve disk 47 by means of a pre-tensioned compression spring 49 such that the valve disk is moved against the valve seat 50 into the closing position of the valve 46. The valve tappet 48 is arranged in the injection channel 42, which surrounds it in the form of an annular cylinder. When the melt is pressed through the injection channel 42 towards the mixing chamber 2, then the valve disk 47 is lifted off the valve seat 50 into the position shown in dashed lines in FIG. 2, so that the melt is injected into the mixing chamber 2 according to the injection direction arrows 51. At the end of the injection operation, when the pressure no longer works on the valve disk 47, the valve disk 47 is again moved into its closing position by the valve tappet 48 due to the compression spring 49. This valve 46, of which the valve disk 47 is positioned if possible directly in the wall 7 of the mixing chamber 2, serves to prevent that material from the mixing chamber penetrates into the plastics processing machine 31.

Instead of the described plastics processing machine in the form of a screw-piston-injection-moulding machine other known plastifying-injection units, too, may be used as plastic melting and injection units, in particular such units in which preplastifying of the plastic material is effected by a screw and in which subsequently the injection is made by means of a piston to be driven separately. Such units, too, are known in practise (see for instance the technical book of A. Limper/P. Barth/F. Grajewski "Technologie der Kautschukverarbeitung", published by Carl Hanser Verlag München Wien, 1989, pages 161 to 163). It is of decisive importance that a very precise feed regulation of the quantity of molten thermoplastic material to be injected is feasible. In the example of embodiment shown this is attained in that the length of the stroke a of the screw shaft 33 can be determined or modified by correspondingly adjusting the limit switches 38, 39. Also in the case of the further mentioned piston injection with screw-preplastifying this feed regulation is realized by the stroke of the piston being correspondingly chosen.

Fillers are supplied to the mixing chamber 2 through the feed shaft 10 when the stamp 13 is lifted. Then the stamp 13 is moved into the closed position shown in FIG. 1. The kneading blades 25, 26 are set going in the direction of the rotation direction arrows 29, 30.

The temperature of the mixing material 52 stirred by the kneading blades 25, 26 is detected by sensors 53 arranged in the mixing chamber and only roughly outlined and a corresponding signal is passed to the control unit 54. The torque of the shafts 23, 24 and thus of the kneading blades 25, 26 is equally detected via the control unit 54 by the power consumption of the not shown drive of the shafts 23, 24 being measured at the latter's current supply line 55. Further, an angular position indicator 56 coupled with a shaft 23 can be provided passing angular position signals to the control unit 54, so that the angular position of the kneading blades 25, 26 and in particular thus also the position of the kneading blade 25 in relation to the valve 46 is detected continuously.

Finally, the input temperature and the output temperature of the temperature-regulating medium is detected by corresponding sensors 57, 58 and passed to the control unit 54. The quantity of energy supplied or dissipated via the temperature-regulating medium can be taken from the temperature difference detected by means of the sensors 57, 58 and from the flow rate detected by the flowmeter 59. The energy supplied to the not shown drives can be measured by way of the power measurement at the current supply line 55. The sum of the energy supplied to the drives and of the energy supplied or dissipated via the temperature-regulating medium—subject to the efficiency of the drives and the heat loss of the internal mixer—reveals the energy fed to the mixing material 52.

The time control of the injection of the molten thermoplastic material is effected as a function of the temperature of the mixing material, and/or the actual torque and/or the mixing time and/or the sum of energy supplied and/or the actual angular position of a shaft 23 or 24 or both shafts 23, 24. The angular position indicator 56 serves to ensure that the injection into the mixing material 52 takes place whenever the latter passes the valve 46, so that good pre-distribution within the mixing material 52 is thus achieved and it is ensured that there is no injection onto the kneading blade 25. The triggering of the piston-cylinder drive 36 takes place via a solenoid valve 60 triggered by the control unit 54. When the molten thermoplastic material is injected before the mixing material is added, then the angular position of the kneading blades is of no importance.

The valve 46 is provided with a heating 61 ensuring that up to the valve disk 47 the molten thermoplastic material has the same temperature as in the melt chamber 43 of the plastics processing machine 31. As seen in FIG. 2, the valve tappet 48 is guided and supported by guide webs 62, 63 in the valve 46.

The described apparatus and the described method can be used in particular when highly loaded thermoplastic compounds are to be manufactured or when thermoplastic elastomeres or cable compounds are to be mixed of caoutchouc, thermoplastics and fillers.

What is claimed is:

1. A mixing apparatus for the mixing of mixing material, such as fillers and/or cauotchouc, with thermoplastic material, the thermoplastic material being melted and the mixing material and the molten thermoplastic material being subjected to a common mixing process, which mixing apparatus comprises
   an internal mixer with a mixing chamber (2),
   a plastics processing machine (31) with an injection unit,
   an injection channel (42) connecting the injection unit of the plastics processing machine (31) with said mixing chamber (2), and
   a valve (46) in the injection channel (42) adjacent to the mixing chamber (2).

2. A mixing apparatus according to claim 1, wherein the valve (46) is a non-return valve.

3. A mixing apparatus according to claim 1, wherein the valve (46) is provided with a heating device (62).

4. A mixing apparatus according to claim 1, wherein the plastics processing machine (31) is a screw machine comprising a housing (32) and a screw shaft (33).

5. A mixing apparatus according to claim 4, wherein the screw machine is an injection-moulding machine further comprising a drive motor (34) for driving the screw shaft (33).

6. A mixing apparatus according to claim 4, wherein the screw machine is an extruder further comprising a drive motor (34) for driving the screw shaft (33).

7. A mixing apparatus for the mixing of mixing material, such as fillers and/or caoutchous, with thermoplastic material, the thermoplastic material being melted and the mixing material and the molten thermoplastic material being subjected to a common mixing process, which mixing apparatus comprises
   an internal mixer with a mixing chamber (2),
   a plastic processing machine (31) with an injection unit and
   an injection channel (42) connecting the injection unit of the plastics processing machine (31) with said mixing chamber (2),
   wherein the plastics processing machine (31) with injection unit is a screw-piston-injection-moulding machine comprising a housing (32), a screw shaft (33), a drive motor (34) and a piston-cylinder drive (36) by means of which the screw shaft (33) can be displaced in the direction of its axis (37) within the housing (32).

* * * * *